United States Patent [19]

Hopkins

[11] Patent Number: 4,869,065

[45] Date of Patent: Sep. 26, 1989

[54] SINGLE SPOOL SELECTOR VALVE FOR SIMULTANEOUS PUMP DISPLACEMENT AND MOTOR DIRECTION CONTROL IN HYDROSTATIC DRIVE

[75] Inventor: DeLaney C. Hopkins, Dwight, Ill.

[73] Assignee: Caterpillar Inc., Peoria, Ill.

[21] Appl. No.: 191,943

[22] Filed: May 9, 1988

[51] Int. Cl.$^4$ .................. F16H 39/46; F04B 49/02
[52] U.S. Cl. ........................... 60/444; 60/493
[58] Field of Search ............... 60/433, 434, 443, 444, 60/487, 488, 489, 493

[56] References Cited

U.S. PATENT DOCUMENTS

| 2,669,935 | 2/1954 | Tucker | 60/443 X |
| 3,236,049 | 2/1966 | Reinke | 60/464 X |
| 3,354,637 | 11/1967 | Croswhite | 60/489 |
| 3,750,406 | 8/1973 | Verlinde et al. | 60/489 X |
| 3,977,301 | 8/1976 | Kroth et al. | 91/412 |
| 4,030,295 | 6/1977 | Khatti et al. | 60/445 |
| 4,099,541 | 7/1978 | Binkley et al. | 137/596.13 |
| 4,436,020 | 3/1984 | Budzich | 91/446 |
| 4,481,770 | 11/1984 | Lohbauer et al. | 60/489 X |

Primary Examiner—Robert E. Garrett
Assistant Examiner—George Kapsalas
Attorney, Agent, or Firm—John W. Grant

[57] ABSTRACT

Reversible hydraulic motors drdiven by fluid from variable displacement pumps are useful in driving various mechanisms of earthmoving machines. It is desirable to control both the speed and direction of the motor with a single lever. The subject hydraulic control system includes a selector valve which has a fluid control section for directing pilot fluid to a reversing valve to reverse the direction of the motor. A signal control valve is mechanically actuated by movement of the selector valve to the operating position so that a regulated pressure control signal is directed to a displacement control of variable displacement pump to regulate the volumetric output of the pump and thus the operating speed of the motor.

8 Claims, 1 Drawing Sheet

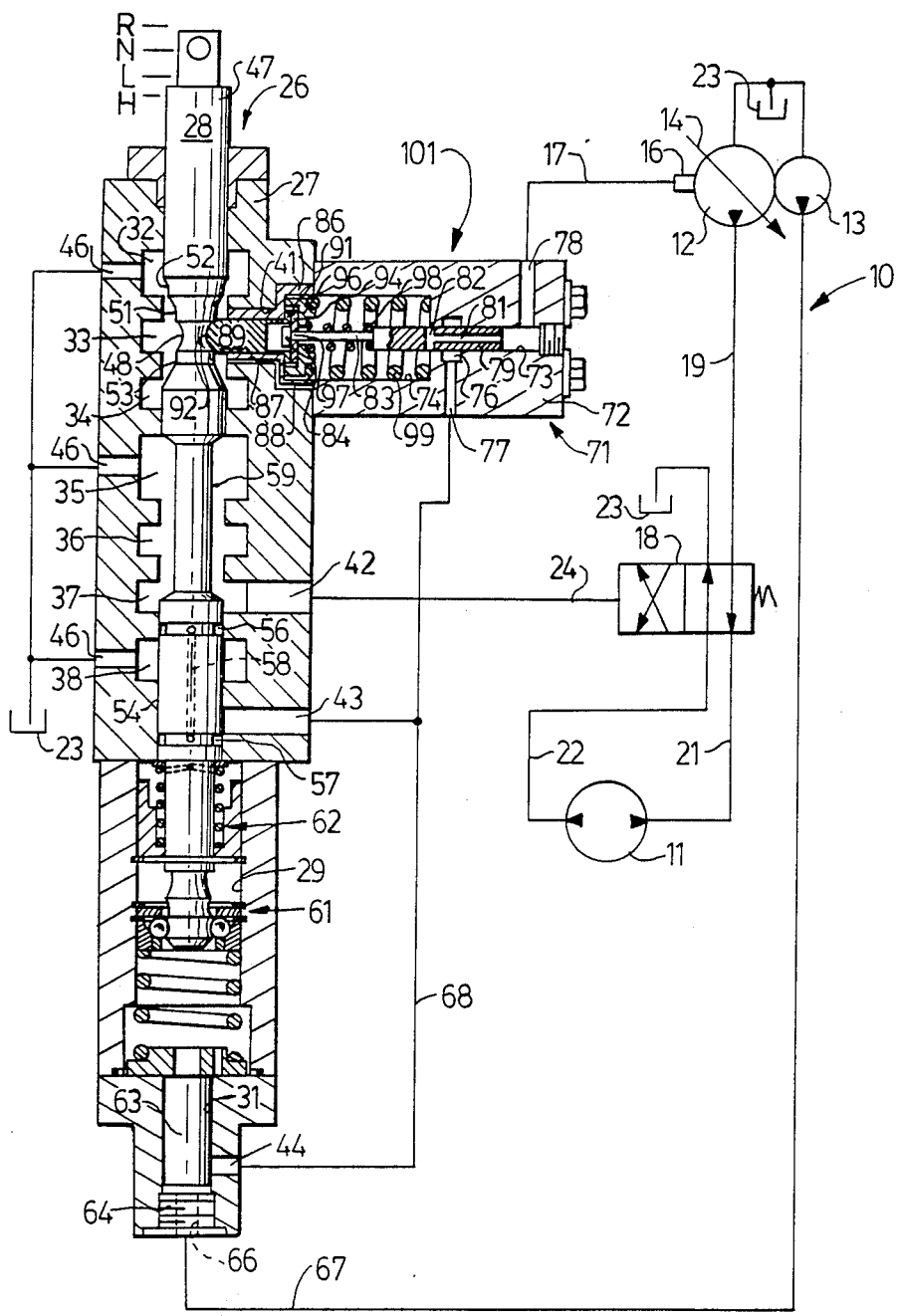

SINGLE SPOOL SELECTOR VALVE FOR SIMULTANEOUS PUMP DISPLACEMENT AND MOTOR DIRECTION CONTROL IN HYDROSTATIC DRIVE

BACKGROUND OF THE INVENTION

1. Field of the Invention

This invention relates to a hydraulic control system and more particularly to a system for selectively controlling the displacement of a variable displacement pump to control the speed of the motor and the position of a reversing valve disposed between the pump and motor to control the direction of rotation of the motor.

2. DESCRIPTION OF THE PRIOR ART

Many variable displacement pumps have a displacement control integral therewith for controlling the angle of a swash plate which in turn controls the volumetric output of the pump. The volumetric output of many of such pumps is selectively adjusted by controlling the pressure level of a control signal directed to the displacement control. It is common practice to direct the fluid output of such variable displacement pumps to a fixed displacement motor wherein the output speed of the motor is dependent upon the angle of the swash plate of the pump. If there is a need to drive the motor in both directions, a reversing valve is commonly employed between the pump and motor to reverse the direction of fluid flow through the motor for reverse operation.

A problem encountered with such pump and motor arrangements is when it is used in an earthmoving machine wherein control of the direction and operating speed of the motor is only one of many other functions that the operator must attend to for proper operation of the machine. Thus, it is desirable to keep the number of operator control levers to as low a number as possible to simplify the operator control of the machine functions.

A situation frequently encountered by earthmoving machine manufacturers is the desirability to maintain commonality of components of similar machines to reduce the overall number of different parts that must be made and thereafter retained in inventory for parts service. For example, a conventional earthmoving scraper and an elevating scraper frequently share many common components with the major difference being that the conventional scraper had a movable apron at the open end of a bowl while the elevating scraper has a powered elevating device at the open end of the bowl. The conventional scraper includes a first lever for controlling the bowl height, a second lever for controlling the opening and closing of the apron and a third lever for controlling an ejector in the bowl. On some scrapers, the control valve actuated by the control levers is referred to as a mono block valve wherein the valve body has interconnecting passages therein and three bores, each of which has a valve spool slidably disposed therein and operatively connected to the levers. Similarly, the elevating scraper has a first lever for controlling the bowl height, a second lever for controlling an ejector in the bowl and ideally should have only a third lever for controlling operation of the elevator drive motor. One of the problems encountered was how to convert one of the spool portions of the valve to an elevator drive motor control while maintaining the mono block valve, particularly where the operating speed of the drive motor is dependent upon controlling the volumetric output of a variable displacement pump while the direction of the motor is controlled by a separate reversing valve.

The present invention is directed to overcoming one or more of the problems as set forth above.

SUMMARY OF THE INVENTION

In one aspect of the present invention a hydraulic control system for operating a reversible hydraulic motor includes a variable displacement hydraulic pump having a displacement control adapted to adjust the volumetric output of the pump in response to receiving a fluid control signal. A pilot operated reversing valve is connected to the pump and to the motor and is movable between a first position at which fluid from the pump drives the motor in one direction and a second position at which fluid from the pump drives the motor in the opposite direction. The reversing valve is moved to the second position when pressurized pilot fluid is directed thereto. A selector valve is connected to a source of pressurized pilot fluid and to the reversing valve and is movable between a neutral position and first and second operating positions wherein the source of pressurized pilot fluid is blocked from the reversing valve at the neutral and first operating position and pilot fluid is directed to the reversing valve at the second operating position. A valve means is connected to the source of pilot fluid and to the displacement control of the variable displacement pump for directing a regulated pressure control signal to the displacement control in response to the selector valve being moved to the first or second operating positions.

The present invention solves the problem of minimizing the number of operator control levers to minimize operator busyness by using the selector valve for controlling the flow of pilot fluid to a reversing valve at the second operating position and making the separate valve means responsive to positioning of the selector valve in either the first or second operating position for directing a regulated pressure control signal to the displacement control of the variable displacement pump. Thus, both the direction of rotation and the rotational speed of the motor are controlled by the operator through actuation of the selector valve only.

BRIEF DESCRIPTION OF THE DRAWING

The sole figure is a diagrammatic and schematic illustration of an embodiment of the present invention.

DETAILED DESCRIPTION OF THE PREFERRED EMBODIMENT

A hydraulic control system 10 is provided for operating a reversible hydraulic motor 11 which can be utilized to drive an elevating mechanism (not shown) of an elevating scraper. The hydraulic system 10 includes a variable displacement hydraulic pump 12 and a source of pressurized pilot fluid such as a pump 13. The pump 12 includes a movable swash plate 14 and a displacement control 16 adapted to control the angle or position of the swash plate 14 and thereby regulate the volumetric output of the pump. The displacement control 16 is of the type in which the swash plate 14 is moved toward the maximum displacement position in response to receiving a pressurized fluid control signal with the angle of the swash plate being dependent upon the pressure level of the control signal. The pump 12 is preferably of the type in which the swash plate 14 is forcibly retained at a zero displacement position in the absence of a control signal. A signal line 17 is connected to the displacement control. While the pump 13 is shown as a fixed displacement pump, it can be a pressure compensated variable displacement pump which normally provides fluid for other vehicular functions.

A pilot operated reversing valve 18 is connected to the variable displacement pump 12 through a supply conduit 19 and to the hydraulic motor 11 through a pair of motor conduits 21,22. The reversing valve 18 is movable between a first position at which the supply conduit 19 is communicated with the motor conduit 21 and the motor conduit 22 is in communication with a tank 23 and a second position at which the supply conduit 19 is in communication with the motor conduit 22 and the motor conduit 21 is in communication with the tank 23. A pilot line 24 is connected to the reversing valve 18. The reversing valve 18 is resiliently biased to the first position and is urged to the second position when a fluid signal is present in the pilot line 24.

A manually actuatable selector 26 includes a multi-piece body 27 having a plurality of coaxial bores 28,29,31 and a plurality of annuluses 32-38 intersecting with and axially spaced along the bore 28. The body 27 in this embodiment is made from a casting designed for a different valving function and several of the annuluses are non functional in this usage. The body has a stepped transverse bore 41 intersecting with the bore 28 adjacent the annulus 33, a port 42 communicating with the annulus 37 and connected to the pilot line 24, a port 43 intersecting the bore 28 at a location between the annulus 38 and the bore 29, a port 44 intersecting with the bore 31, and a plurality of drain passages 46 diagrammatically shown being connected to the annuluses 32,35 and 38 and to the tank 23.

The selector valve 26 includes a spool 47 reciprocatably slidably disposed in the bore 28 and has an annular groove 48 which is substantially in alignment with the transverse bore 41 when the spool is in the position shown in the drawing. A pair of cam surfaces 51,52 are provided on one side of the annular groove 48 and another cam surface 53 is formed on the other side of the annular groove. The spool 47 has a fluid control section 54 which includes a pair of spaced apart annular grooves 56,57 interconnected by a passageway 58. An annular groove 59 is provided on the spool between the cam surface 53 and the fluid control section 54. The annular groove 59 interconnects the annuluses 35,36 and 37 when the spool is at the position shown. A detent mechanism 61 and a spool centering mechanism 62 of conventional design are connected to the spool 47 and disposed in the bore 29. The detent mechanism 61 includes a piston 63 slidably disposed in the bore 31. A fitting 64 is suitably threadably connected in the bore 31 and has an inlet port 66 in communication with the bore 31 at the end of the piston 63.

A pilot fluid supply line 67 connects the pump 13 to the inlet port 66. Another pilot line 68 interconnects the ports 44 and 43. Pressurized fluid in the pilot line 67 shifts the piston 63 upwardly so that the pressurized fluid is made available to the pilot line 68 so long as the pump 13 is operating. The valve spool 47 is movable from the neutral or nonoperational position "N" as shown and to three operating positions indicated by the letters "L", "H" and "R". "L" and "H" represents low and high speed operation respectively of the motor 11 in the forward direction and "R" represents reverse operation of the motor.

A signal control valve 71 includes a body 72 suitably connected to the body 27 of the selector valve 26. The body 72 has a pair of concentric bores 73,74 coaxial with the bore 41 in the body 27, an annulus 76 intersecting the bore 73, an inlet port 77 in communication with the annulus 76 and connected to the pilot line 68, and an outlet port 78 in communication with the bore 73 and connected to the signal line 17. The signal control valve 71 includes a spool 79 which is slidably disposed in the bore 73 and has an axial passage 81 therein opening at the end of the spool adjacent the outlet port 78 and a transverse passage 82 which intersects the axial passage 81. When the spool 79 is at the position shown the transverse passage 82 opens into the bore 74. A reduced diameter stem 83 is suitably connected to the end of the spool 79 and extends toward the spool 47 of the selector valve 26. An enlarged flange 84 is provided at the distal end of the stem 83. A stepped adapter sleeve 86 is seated in the transverse bore 41 of the body 27 and has a stepped bore 87 therein concentric with the bore 41. A plurality of slots, one of which is shown at 88, are provided in the peripheral surface of the sleeve to provide continuous communication between the bore 74 and the bore 28 in the body 27 adjacent the annulus 33. A plunger 89 is slidably positioned in the bore 87 and has a flange 91 seated against the sleeve 86 and a rounded end 92 seated in annular groove 48 of the spool 47. A flat annular connector 94 is positioned between the flange 91 and an annular spring seat 96 and has a central opening 97 therein through which the stem 83 freely passes. An inner coil spring 98 surrounds the stem 83 and is positioned between the spring seat 96 and the spool 79 to resiliently bias the spool 79 in a direction away from the spool 47. An outer coil spring 99 surrounds the coil spring 98 and is positioned between the spring seat 96 and the body 72. The spring 99 resiliently biases the plunger 89 and thus the spool 79 to the position shown.

The signal control valve 71 constitutes a valve means 101 for directing a regulated pressure control signal to the displacement control 16 of the variable displacement pump 12 in response to the spool 47 of the selector valve 26 being moved to any one of the three operating positions.

Industrial Applicability

In the use of the present invention, it is to be assumed that both pumps 12 and 13 are driven byan engine. The pump 13 directs pressurized fluid through the pilot fluid supply line 67 and the port 66 and into the bore 31. The pressurized fluid in the bore 31 moves the piston 63 upwardly to activate the detent mechanism 61 so that it will resiliently retain the spool 47 in any position selected by the operator. The movement of the piston 63 also establishes a flow path through the port 44 so that pressurized outlet fluid is transmitted into the pilot line 68. Rotation of the motor 11 is selectively obtained by the operator shifting the spool 47 of the selector valve 26 from the neutral position shown to either "L", "H" or "R". With the spool 47 at the position shown the fluid control section 54 blocks fluid flow through the port 43 while the port 42 is communicated with the tank 23 through the annulus 37, the annular groove 59, the annuluses 36 and 35, and the drain passage 46. Thus, the pilot fluid from the pump 13 is blocked from the reversing valve 18 which is thus biased to the first position as shown. Moreover, at the neutral position of the spool 47, the spring 99 of the signal control valve 71 biases the plunger 89 and thus the spool 79 to a first position shown at which no control signal is directed to the displacement control 16 of the variable displacement pump 12. More specifically, with the spool 79 at the position shown, the line 17 is communicated to the tank 23 through the outlet port 78, the bore 73, the passages 81 and 82 in the spool 79, the bore 74, the slots 88 in the sleeve 86, the annuluses 33 and 32, and the drain passage 46. The displacement control 16 automatically moves the swash plate 14 of the variable displacement pump 12 to a zero displacement position in the absence of a control signal in the line 17 so that no fluid is directed to the motor 11. The motor 11 therefore is not driven.

Low speed forward drive of the motor 11 is obtained by the operator selectively moving the spool 47 downwardly to the L position. In so doing the cam surface 51 mechanically actuates or moves the plunger 89 rightwardly as viewed in the drawing to a second position thereby causing the spring 98 to move the spool 79 to a position at which the transverse passage 82 communicates with the annulus 76. At such position pressurized fluid from the conduit 68 passes through the port 77, the passages 82 and 81, the bore 73, the outlet port 78, and the signal line 17 to the displacement control 16. The fluid in the bore 73 acts against the end of the spool 79 urging the spool leftwardly against the bias of the spring 98. The coaction of the transverse passage 82 and the annulus 76 causes a reduction in the fluid pressure from the conduit 68 so that a regulated pressure control signal is directed to the displacement control 16. The regulated pressure control signal is sufficient to establish a predetermined volumetric output of the variable displacement pump 12 so that the motor 11 is driven at a preselected speed. With the valve spool 47 at the "L" position, the line 24 remains in communication with the tank 23 so that the reversing valve 18 remains at the position shown. Thus, the motor 11 is driven in the forward direction.

To achieve the high speed operation of the motor 11 the operator moves the valve 47 downwardly to the "H" position causing the cam surface 52 to further mechanically actuate or move the plunger 89 rightwardly to a third position to increase the biasing force of the coil spring 98 acting against the spool 79 and thereby causes an increase in the regulated pressure control signal being directed to the displacement control 16. The regulated pressure control signal is increased to a second predetermined level sufficient to establish a second predetermined volumetric output of the pump 12 so that the motor 11 is driven at a second predetermined speed.

Reverse operation of the motor 11 is obtained by moving the spool 47 upwardly to the "R" position. Such movement of the spool causes the cam surface 53 to mechanically move the plunger 89 to the second position. As previously noted with the plunger 89 at the second position, a regulated pressure control signal having a predetermined pressure level is directed to the displacement control 16 resulting in the swash plate 14 being adjusted to provide a predetermined volumetric output of the variable displacement pump 12. Also, with the spool 47 at the "R" position, pressurized fluid from the conduit 68 passes through the port 43, the annular groove 57, the passage 58, the annular groove 56, the port 42, and the pilot line 24 to shift the reversing valve 18 to the second position wherein the pressurized fluid from the pump 12 passes through the conduit 22 to drive the motor 11 in the reverse direction.

In this embodiment the speed of the motor in low forward and reverse is the same. However, if so desired the cam surfaces 51 or 53 can be arranged to provide different operating speeds in the low forward and reverse settings.

In view of the foregoing, it is readily apparent that the structure of the present invention provides an improved hydraulic control system for controlling operation of a reversible hydraulic motor wherein the speed and direction of the motor is controlled through the manual actuation of the selector valve. The selector valve has a fluid control section for controlling the direction of the hydraulic motor and a plurality of camming surfaces for mechanically actuating a control signal valve which in turn controls the displacement of a variable displacement pump. Controlling the displacement of variable displacement pump in turn controls the operating speed of the motor.

Other aspects, objects and advantages of this invention can be obtained from a study of the drawings, the disclosure and the appended claims.

I claim:

1. A hydraulic control system for operating a reversible hydraulic motor comprising:
   a variable displacement hydraulic pump having a displacement control adapted to adjust the volumetric output of the pump in response to receiving a fluid control signal;
   a pilot operated reversing valve connected to the pump and to the motor and being movable between a first position at which fluid from the pump drives the motor in a forward direction and a second position at which fluid from the pump drives the motor in a reverse direction, said reversing valve being moved to the second position when pressurized pilot fluid is directed thereto;
   a source of pressurized pilot fluid;
   a manually actuatable selector valve connected to the source of pressurized pilot fluid and to the reversing valve and having a spool movable between a neutral position and first and second operating positions wherein the source of pressurized pilot fluid is blocked from the reversing valve at the neutral and first operating positions and pilot fluid is directed to the reversing valve at the second operating position; and
   valve means connected to the source of pilot fluid and to the displacement control of the pump and being positioned for direct mechanical actuation by the spool of the selector valve for directing a regulated pressure control signal to the displacement control when the spool is moved to the first or second operating positions.

2. The control system of claim 1 wherein said valve means includes a signal control valve having a plunger movable between a first position at which no control signal is communicated to the displacement control and a second position at which a regulated pressure control signal is delivered to the displacement control and is sufficient to establish a predetermined volumetric output of the pump, said plunger being moved from the first to the second position in response to moving the selector valve from the neutral position to the first or second operating position.

3. The hydraulic control system of claim 2 wherein said selector valve includes spool movable between the neutral and the first and second operating positions and having an annular groove provided thereon and having first and second cam surfaces on opposite sides of the annular groove, said plunger being seated in the annular groove at the neutral position of the spool and is movable to the second position by the first and second cam surfaces when the spool is moved to the first and second operating positions.

4. The hydraulic control system of claim 3 wherein said signal control valve includes a spool and a spring disposed between the plunger and the spool, said spool being retained at a position at which pressurized fluid from the source of pressurized fluid is blocked from the displacement control when the plunger is in the first position and bring resiliently moved by the spring to a position for directing the pressure regulated control signal to the displacement control when the plunger is moved to the second position.

5. The hydraulic control system of claim 4 wherein the plunger is moved to a third position at which the pressure level of the pressure regulated control signal directed to the displacement control is increased to a second predetermined level sufficient to establish a second predetermined volumetric output of the variable displacement pump, and said spool of the selector valve has a third cam surface adjacent the second cam surface and is movable to a third operating position wherein the cam surface moves the plunger to the third position.

6. A hydraulic control system for operating a reversible hydraulic motor comprising:
   a variable replacement hydraulic pump having a displacement control adapted to adjust the volumetric output of the pump in response to receiving a fluid control signal;
   a pilot operated reversing valve connected to the pump and to the motor and being movable between a first position at which fluid from the pump drives the motor in a forward direction and a second position at which fluid from the pump drives the motor in a reverse direction, said reversing valve being moved to the second position when pressurized pilot fluid is directed thereto;
   a source of pressurized pilot fluid;
   a manually actuatable selector valve connected to the source of pressurized pilot fluid and to the reversing valve and having a spool movable between a neutral and first and second operating positions wherein the source of pressurized pilot fluid is blocked from the reversing valve at the neutral and first operating positions and the pilot fluid is directed to the reversing valve at the second operating position, said spool having an annular groove provided thereon and first and second cam surfaces on opposite sides of the annular groove; and
   valve means connected to the source of pilot fluid and to the displacement control of the pump, said valve means including a signal control valve having a plunger movable between a first position at which no control signal is communicated to the displacement control and a second position at which a regulated pressure control signal is delivered to the displacement control and is sufficient to establish a predetermined volumetric output of the pump, said plunger being seated in the annular groove at the neutral position of the spool and is movable to the second position by the first and second cam surfaces when the spool is moved to the first and second operating positions.

7. The hydraulic control system of claim 6 wherein said signal control valve includes a spool and a spring disposed between the plunger and the spool, said spool being retained at a position at which pressurized fluid from the source of pressurized fluid is blocked from the displacement control when the plunger is in the first position and being resiliently moved by the spring to a position for directing the pressure regulated control signal to the displacement control when the plunger is moved to the second position.

8. The hydraulic control system of claim 7 wherein the plunger is moved to a third position at which the pressure level of the pressure regulated control signal directed to the displacement control is increased to a second predetermined level sufficient to establish a second predetermined volumetric output of the variable displacement pump, and said spool of the selector valve has a third cam surface adjacent the second cam surface and is movable to a third operating position wherein the cam surface moves the plunger to the third position.

* * * * *